W. J. McINTYRE.
NUT.
APPLICATION FILED MAR. 21, 1913.

1,109,347.

Patented Sept. 1, 1914.

Witnesses:
Josephine M. Strempfer.
O. F. Eaton

Inventor:
William J. McIntyre
by Harry P. Williams
atty.

UNITED STATES PATENT OFFICE.

WILLIAM J. McINTYRE, OF HARTFORD, CONNECTICUT, ASSIGNOR TO THE ALLEN MANUFACTURING COMPANY, OF HARTFORD, CONNECTICUT, A CORPORATION OF CONNECTICUT.

NUT.

1,109,347.  Specification of Letters Patent.  Patented Sept. 1, 1914.

Application filed March 21, 1913. Serial No. 755,921.

*To all whom it may concern:*

Be it known that I, WILLIAM J. MCINTYRE, a citizen of the United States, residing at Hartford, in the county of Hartford and State of Connecticut, have invented a new and useful Improvement in Nuts, of which the following is a specification.

This invention relates to the construction of a bolt nut.

It quite frequently happens that it is necessary to screw nuts onto the ends of bolts in such confined localities that it is impossible to apply to the nut the ordinary monkey wrench, pipe wrench, socket wrench or capstan bar, and if it is possible to apply such a tool to the nut it cannot be turned on account of the proximity of other nuts or adjacent walls or projecting parts of the machines with which the bolts and nuts are to be used.
Frequently the space between other nuts or parts of machines is such that the ordinary hexagonal nut cannot turn. Occasionally it is desirable to screw a nut down into a hole, particularly in a rotating part, in order that there shall be no projection which will catch or strike any person or thing brought too near to the rotating part. In such instances it is essential to have the hole as small as can be in order that the part in which it is made shall be weakened as little as possible. It often is necessary to screw a nut upon a bolt thus inconveniently located, so very hard that sockets and a spanner wrench, or a slot and screw driver, cannot be made use of because of the lack of strength of such tools, and also the weakening of the nut by reason of the spanner sockets, screw slot or capstan bar holes.

The object of this invention is to overcome these inconveniences and difficulties by providing a nut which is simple and cheap and can be screwed very tightly into place on the end of the bolt where the space for the nut and for manipulating the nut turning implement is limited. This object is attained by making a nut which has a cylindrical exterior and thus has a much smaller diameter and can be turned in a smaller space or hole than the ordinary hexagonal nut, and which is thicker than the ordinary nut and in the interior besides the usual threaded hole has a hexagonal, square or other irregularly shaped socket into which a plug wrench may be inserted for turning the nut tightly to place.

Figure 1:
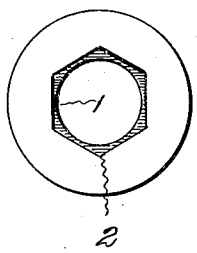
Figure 2:
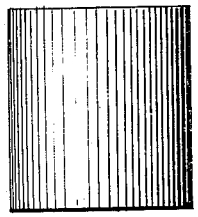
Figure 3:
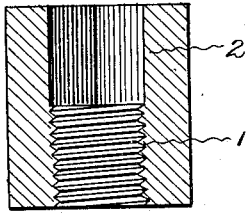
Figure 4:
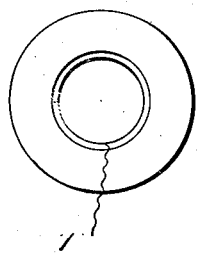

Figure 1 of the accompanying drawings shows a top view of a nut which embodies this invention. Fig. 2 shows a side view. Fig. 3 shows a central section, and Fig. 4 shows a bottom view.

The nut is made of steel or other metal having sufficient strength and is cylindrical on the exterior so as to have the greatest possible strength with a minimum diameter. This nut is made somewhat thicker than the ordinary nut and in the interior for a distance up from the bottom it is provided with the ordinary nut threads 1 which are designed to screw upon the bolt to which the nut is to be applied. These threads are cut the usual standard depth, pitch and length to give the nut the same strength as the ordinary nut, so that it may be screwed up very powerfully and will hold without danger of stripping the threads. In the upper end of the nut is a socket 2 which is desirably made with hexagonal walls for receiving a plug wrench having similar cross-sectional shape. The exact shape of the socket is immaterial.

The nut which embodies this invention can be made in any sizes in large numbers very rapidly and cheaply on ordinary nut forming or screw machines, by simply changing the shape of the tool and holders. It is as strong as the common nut. It can be set on the end of a bolt just as hard without danger of stripping the threads as the nuts in common use. The nut has a maximum strength with a minimum diameter and weight. It can be set firmly in a hole of the smallest possible diameter, for instance it can be turned on to the end of a bolt in a hole in the hub of a pulley without materially weakening the pulley. It can also be turned on to a bolt and into places where there are a number of bolts arranged very closely together and it is impossible to use the ordinary hexagonal nut, or where it is impossible in view of other nuts or projecting walls or parts of a machine to turn the nut with a monkey wrench, pipe wrench or socket wrench. This nut is not weakened by a screw slot, by spanner sockets, or by capstan holes, and it can be turned up much more solidly than is possible with a spanner wrench or with a screw driver.

The invention claimed is:

A nut for bolts having a plane cylindrical exterior surface and an opening extending axially through the interior, the opening for a substantial distance in from one end of the nut being hexagonal to provide a strong wrench socket, and the opening for a substantial distance in from the other end of the nut being cylindrical and provided with a continuous screw thread of uniform pitch and height, the threaded cylindrical section of the opening being of less diameter than the diameter of the hexagonal section of the opening so as to provide a shoulder at the bottom of the wrench socket.

WILLIAM J. McINTYRE.

Witnesses:
 JOSEPHINE M. STREMPFER,
 HARRY R. WILLIAMS.